Aug. 15, 1939.　　　　H. TUNICK　　　　2,169,305

LOW-LOSS CIRCUITS

Original Filed June 15, 1935　　4 Sheets-Sheet 1

INVENTOR
HARRY TUNICK
BY (signature)
ATTORNEY

Aug. 15, 1939.　　　　H. TUNICK　　　　2,169,305
LOW-LOSS CIRCUITS
Original Filed June 15, 1935　　4 Sheets-Sheet 2

INVENTOR
HARRY TUNICK
BY
ATTORNEY

Aug. 15, 1939.     H. TUNICK     2,169,305
LOW-LOSS CIRCUITS
Original Filed June 15, 1935     4 Sheets-Sheet 3

INVENTOR
HARRY TUNICK
BY
ATTORNEY

Aug. 15, 1939.   H. TUNICK   2,169,305
LOW-LOSS CIRCUITS
Original Filed June 15, 1935   4 Sheets-Sheet 4

INVENTOR
HARRY TUNICK
BY H. S. Grover
ATTORNEY

Patented Aug. 15, 1939

2,169,305

UNITED STATES PATENT OFFICE 2,169,305

LOW-LOSS CIRCUITS

Harry Tunick, Rye, N. Y., assignor to Radio Corporation of America, a corporation of Delaware Application June 15, 1935, Serial No. 26,749
Renewed September 10, 1937

26 Claims. (Cl. 250—36)

My present invention relates to high frequency apparatus and has for its principal object the general improvement of resonant line or low loss circuit controlled apparatus.

Resonant line controlled systems, such as oscillation generators, frequently make use of a low loss grid or control electrode circuit consisting of a pair of concentric tubes, a multiple of a one-quarter wave length long at a desired frequency of operation. The output circuit, which usually takes the form of a condenser and coil connected in parallel, is relatively unstable electrically and mechanically and introduces frequency changes which, although small are undesirable. To eliminate this objection is a further and more specific purpose of my invention. I fulfill it by making the output circuit as well as the input circuit of the vacuum tube generator in the form of a stable, low loss current such as resonant concentric tubes or transmission lines having high radio frequency current carrying capacity. A still further object of my present invention is to conserve the space required by the foregoing apparatus and this I do by telescopically or concentrically arranging the concentric tubes of the input and output circuits.

Such an arrangement in simple form employs four concentric tubes. However, although efficient in action, it is necessarily costly and weighty because of the number of large diametered tubes required. Hence, to lessen the number of tubes and, specifically, to make three resonant cylinders, of uniform or non-uniform diameter, do the work of four without losing any of the advantages thereof is a further aim of my invention. This is accomplished by connecting and utilizing the surfaces of one cylinder, so that, in effect, it acts as two distinct metallic tubes. Briefly, I so arrange and connect three concentric tubes that high frequency currents for one circuit, say, the grid circuit, flow on the outer surface of the inner tube and on the inner surface of the intermediate or middle tube surrounding the inner tube. The other high frequency circuit effectively consists of the inner surface of the outer cylinder and the outer surface of the intermediate or middle cylinder.

The foregoing, together with other objects, advantages and features, will be more fully understood as the description of my invention, which will be given with the aid of the accompanying drawings, proceeds.

Referring to the drawings.

Figure 9:
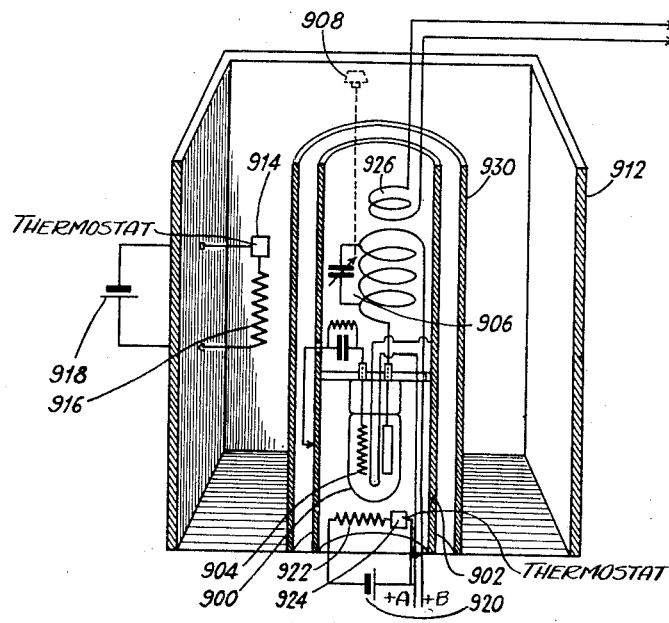
Figure 10:
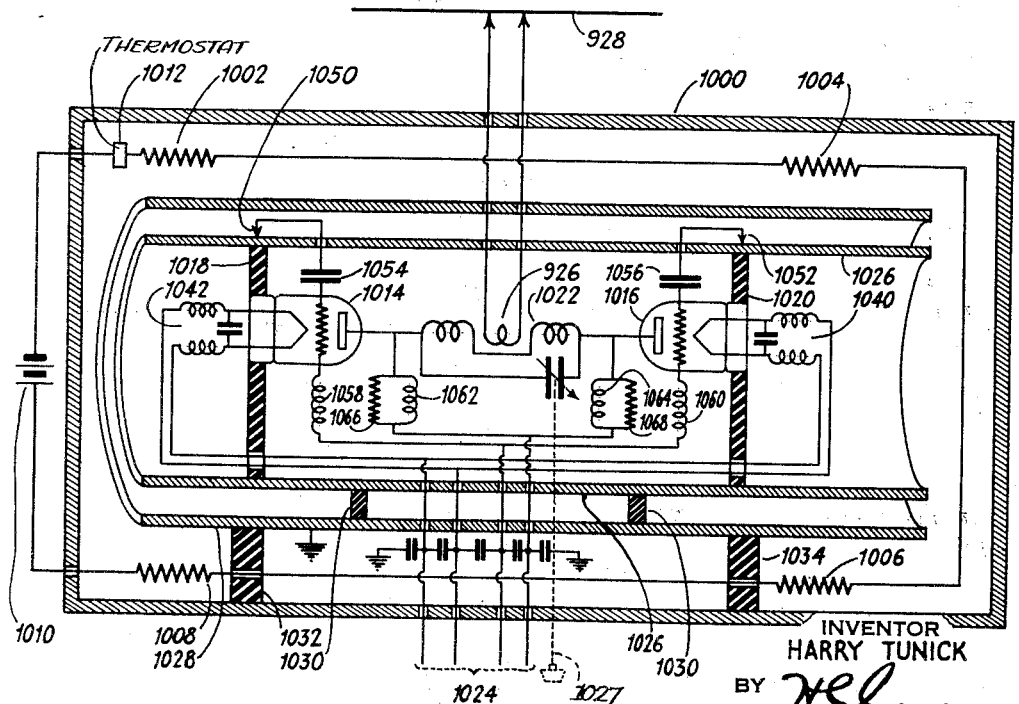

Figure 9 is a modification in which two cylindrical metallic tubes are used for frequency control of a single tube oscillation generator. This figure is particularly characterized by a novel arrangement of the vacuum tube and frequency controlling circuit. Figure 10 is a further modification similar to Figure 9, but showing a push-pull arrangement of vacuum tubes and concentric conductors for oscillation generation and control.

Figure 1:
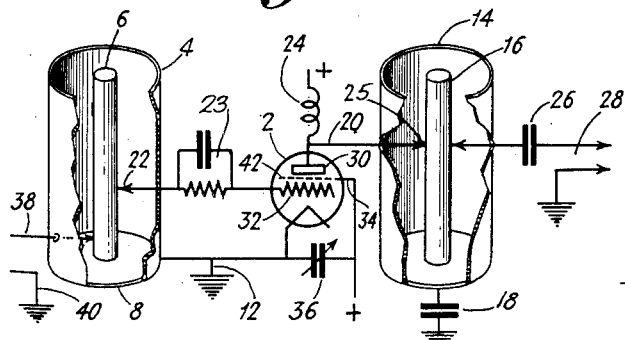
Figure 1 is a schematic illustration of a vacuum tube employed as an amplifier or oscillation generator and, as shown partially broken away, having concentric tube or metallic cylindrical input and output circuits.

Turning to Figure 1, the electron discharge device or vacuum tube 2 is provided with concentric tube input and output circuits. The input or grid circuit includes the outer metallic cylinder 4 and the inner hollow pipe 6 connected together at their bottom ends 8 and grounded at 12. Similarly, the plate circuit consists of a pair of concentric hollow metallic tubes or pipes 14, 16 grounded for radio frequency currents by means of the by-passing condenser 18. Condenser 18 may, if desired, be short-circuited and the base plate of tubes 14, 16 directly grounded, in which case a direct current blocking condenser should be placed in lead 20. Grid bias is maintained by the action of the condenser and grid leak arrangement 23 and plate voltage is supplied through the choke coil 24.

The tubes 4, 6 and 14, 16 are made of such a length as to resonate at the desired operating frequency. Their lengths, therefore, will be substantially one-quarter wave length at the desired operating frequency. To make the frequency variable, sections of pipe or tubing may be telescoped into the open ends of the tubes 4, 6 and 14, 16 and adjusted so that the overall length corresponds to the frequency desired.

Figure 1A:
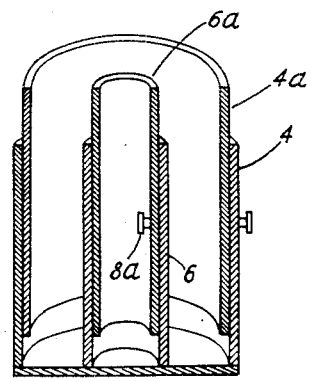
Figure 1a shows one way of adjusting the lengths and hence the tuning of the concentric tube circuits used in any of the forms of my invention herein disclosed.

Thus, as shown in Figure 1a, tube 6a may be telescoped within tube 6 and kept at a desired length by virtue of the frictional engagement of the two tubes or, a set screw 8a may be provided for locking tube 6a in fixed relation with respect to tube 6. Similarly, there may be provided a telescopic tube 4a in frictional or set screw engagement with the outer tube 4. It is to be noted that the set screws are preferably placed so that their heads protrude from surfaces which do not carry radio frequency currents.

Returning again to Figure 1, the grid lead is tapped to a point 22 on the inner tube 6 such that the section of the resonant line between point 22 and base plate 8 properly loads the grid filament electrodes of tube 2. So also, is tapping point 25 chosen on the resonant line 16 and output energy is taken through the by-passing condenser 26 and from output leads 28.

Oscillation generation in the system shown in Figure 1 takes place by virtue of regenerative action through the capacity existing between the plate 30 and grid 32. This feedback action may be reduced to any desired value by means of a screen grid 42 provided with an adjustable grounded condenser 36.

The system of Figure 1 may be used as a short wave amplifier in which case input energy will be applied to the inner tube 6 through lead 38 and the grounding lead 40. The taps 22 and 25, in this case, should be lowered on tubes 6 and 16 and the condenser 36 adjusted in such a way as to series resonate the inductance of the screen grid lead 34 so as to effectively maintain the screen grid 42 at ground radio frequency potential.

Figure 2:
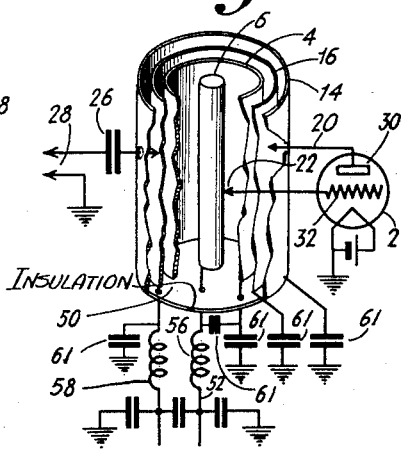
Figure 2 illustrates a system similar to Figure 1 in which, in order to conserve space the tubes or metal cylinders forming the circuits are concentrically or telescopically arranged.

In order to conserve space, I have provided the arrangement shown in Figure 2 in which the tubes forming the grid and plate crcuits are arranged concentrically with respect to each other. The base plate 50 for the concentric resonant line 6, 4, 16, 14 of Figure 2 is, however, made of insulation material so that negative grid potential may be supplied to the grid 32 of tube 2 through biasing lead 52, choke 56 and inner tube 6. Similarly, plate potential is fed through choke coil 58, tube 16 and lead 20 to plate 30. Output energy, as before, is taken from leads 28, one of which is connected to ground and the other of which is connected through condenser 26 to a suitable point on the outer surface of concentric cylinder 16 or to a suitable point on the inner surface of outer cylinder 14 through a condenser such as 26. Similarly, tapping point 22 could be made, if desired, on a suitable point on the inner surface of cylinder 4. The lower ends of all of the concentric cylinders or tubes are suitably by-passed to ground by the by-pasing condensers 61.

Because of skin effect, radio frequency currents flow on the outer surface of cylinder 6 and the inner surface of cylinder 4 and on the outer surface of tube 16 and on the inner surface of tube 14. Since the outer surfaces of tubes 14 and 4 of Figures 1 and 2 are at ground radio frequency potential throughout their extent, the concentric cylinders or resonant lines may be further combined and simplified as shown in Figure 3 wherein three concentric tubes replace the four required in Figures 1 and 2.

Figure 3:
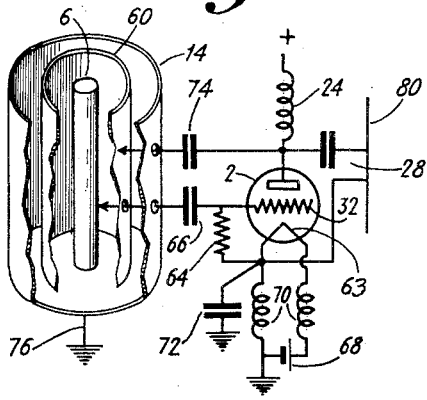
Figure 3 illustrates an oscillation generator used in a transmitter and illustrates the manner in which the effects of a four tube system such as shown in Figure 2 may be obtained by the use of three concentric tubes.

In the system of Figure 3 there is provided a metallic end plate between the cylinders, this plate being maintained at ground potential by lead 76. The outer surface of cylinder 6 and the inner surface of cylinder 60 carry radio frequency currents which control the voltages applied aaginst the grid 32 and cathode 63 of vacuum tube 2 which is provided with grid bias by the action of resistor 64 and condenser 66 and which is provided with cathode heating current from battery or any other source of potential 68 through radio frequency chokes 70. The chokes 70, together with condenser 72, keeps radio frequency currents from flowing through the source 68. If desired, condenser 72 may be omitted so that the filament 63 also swings at radio frequency potential. Moreover, if desired, either blocking condenser 66 or 74 could be omitted, in which event a blocking condenser would be thereby placed in series with the direct current grounding lead 76 as will be apparent to those skilled in the art. Plate voltage is applied through the plate lead choke 24, as before, and the output energy appearing in leads 28 is fed to a suitable radiating antenna 80.

In Figure 3 radio frequency currents flow, because of skin effect, on the outer surface of cylinder 6. Because of these circulating currents which flow on the outer surface of cylinder 6, the resonant line 6 serves to frequency control the frequency of oscillations generated by tube 2. This action is enhanced by virtue of the fact that the plate circuit of tube 2, in effect, consists of the outer surface of cylinder 60 and the inner surface of cylinder 14. The main function of cylinder 14 is to prevent radiation of energy from the cylinder 60. At some cylindrical plane concentric with the inner and outer surfaces of cylinder 60 there is zero flow of radio frequency current. In other words, radio frequency action takes place only on the immediate inner and outer surfaces of the cylinder 60. If desired, each of the cylinders 14, 60 and 6 of Figure 3 may be provided with extensible telescoping cylinders such as shown in Figure 1a in order to provide for adjustment in frequency of operation.

Figure 4:
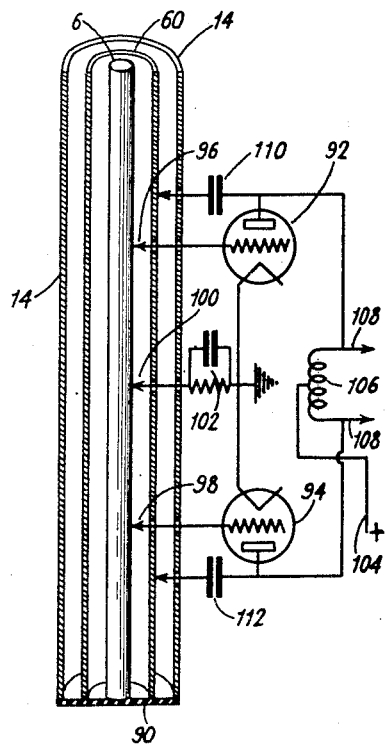
Figure 4 illustrates my improved triple concentric tube system connected to a push-pull arrangement of vacuum tubes.

The simplified arrangement of concentric tubular grid and plate circuits as applied to a push-pull oscillation generator is shown in Figure 4 in which the cylinders are illustrated as resting upon an insulating base plate 90 which may be, if desired, eliminated and the concentric tubes supported in any suitable way from the outer surface of cylinder 14 which is at zero or ground radio frequency potential. The grids of tubes 92, 94 are tapped at points 96, 98 to and symmetrically about the electrical center 100 of resonant line 6. In this case shown in Figure 4, the concentric tubes are made one-half wave length long at the desired operating frequency and the tubes may be provided with telescoping members such as shown in Figure 1a at both their upper and lower ends for purposes of frequency adjustment. Grid bias is maintained by the action of the grid leak resistance and condenser combination 102 and plate voltage is supplied through lead 104 and the high frequency impedance coil 106. Output energy is taken directly from the leads 108 connected to the plates of the tubes 92, 94 which, in turn, are connected through by-passing condensers 110, 112 symmetrically to the outer surface of cylinder 60. If desired, the mid-point of cylinder 60 may be grounded directly or through a by-passing condenser since this point is a voltage nodal point for the radio frequency currents involved.

Figure 6:
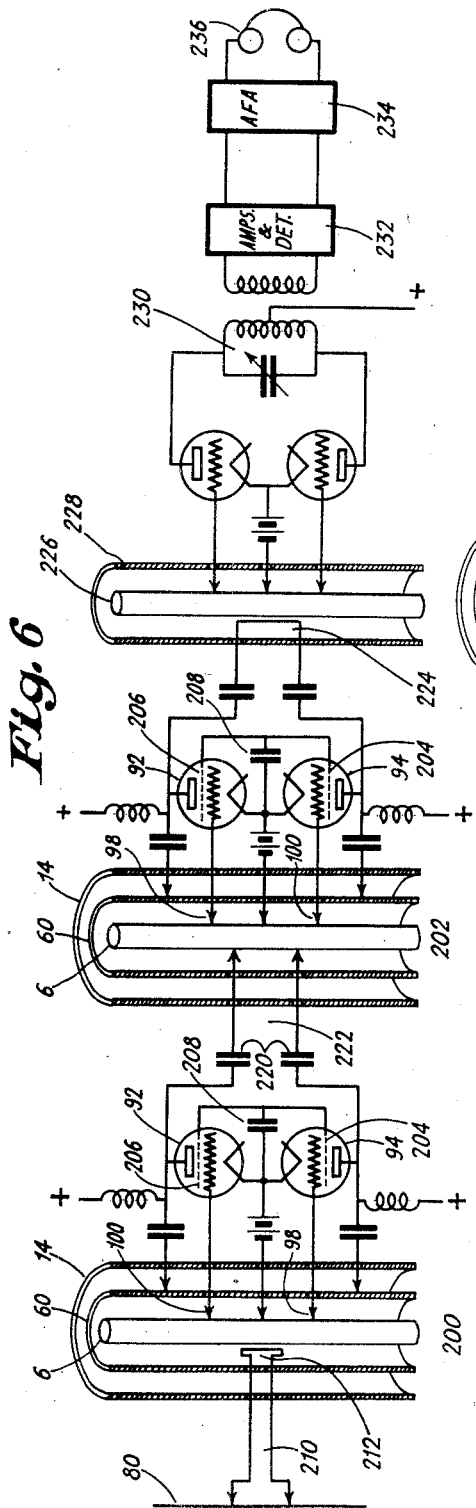
Figures 5 and 6 illustrate ways in which my present invention may be employed for the reception of short wave high frequency energy.

The system shown in Figure 4 may be used for amplification purposes and such an arrangement is shown in Figure 6 in which the concentric cylinder structures 200, 202 are similar to the structure shown in Figure 4 and consists of concentric cylinders or resonant lines 6, 60, 14, each a one-half wave length long at the operating frequency. The vacuum tubes 92, 94 are, however, provided with screen grids 204, 206 grounded for radio frequency currents by the action of by-passing condenser 208 which may, if desired, be adjusted so as to series resonate the inductance of the screen grid leads at the operating frequency.

Input energy picked up on antenna 80 is fed through the line 210 and coupling loop 212 to the resonant line 6 of the coaxial cylinder system 200. This energy is resonated in the cylinder 6 adjusted to the desired operating frequency amplified by the first radio frequency push-pull amplifier stage and resonated in the plate circuit of that stage comprising the outer surfaces of tubes 60 and 14 of the coaxial cylinder system 200. This resonated, amplified energy is fed through the by-passing condensers 220 and transmission line 222, to the cylinder 6 of the system 202, amplified by the vacuum tubes 92, 94 of the second push-pull radio frequency amplifier stage, resonated in the concentric cylinder system for that stage comprising the outer surface of tube 60 and the inner surface of tube 14 of the system 202 and fed through the inductive coupling 224 to the resonant line 226 of a first push-pull detector stage 228. The resonant line 226 and its surrounding cylinder 228 are adjusted in length so as to produce oscillations in the push-pull oscillation generation stage of such a frequency as to beat with oscillations in loop 224 and produce a beat of a much lower radio frequency which may be resonated and picked off in the parallel tuned circuit 230. The energy of circuit 230 is fed into amplifiers and detectors 232 and finally into an audio frequency amplifying stage 234 energizing a suitable translating device such as earphones 236. If desired, the circuit 230 will consist of a concentric tube about 228 in which case the tubes 228 and its outer concentric tube will be made of greater length so as to correspond to a one-half wave length so as to produce a proper beat frequency. The inner resonant line 226 in that case would consist of a shorter tube of the length indicated corresponding to the frequency of oscillation of the local oscillation stage 228.

Figure 5:
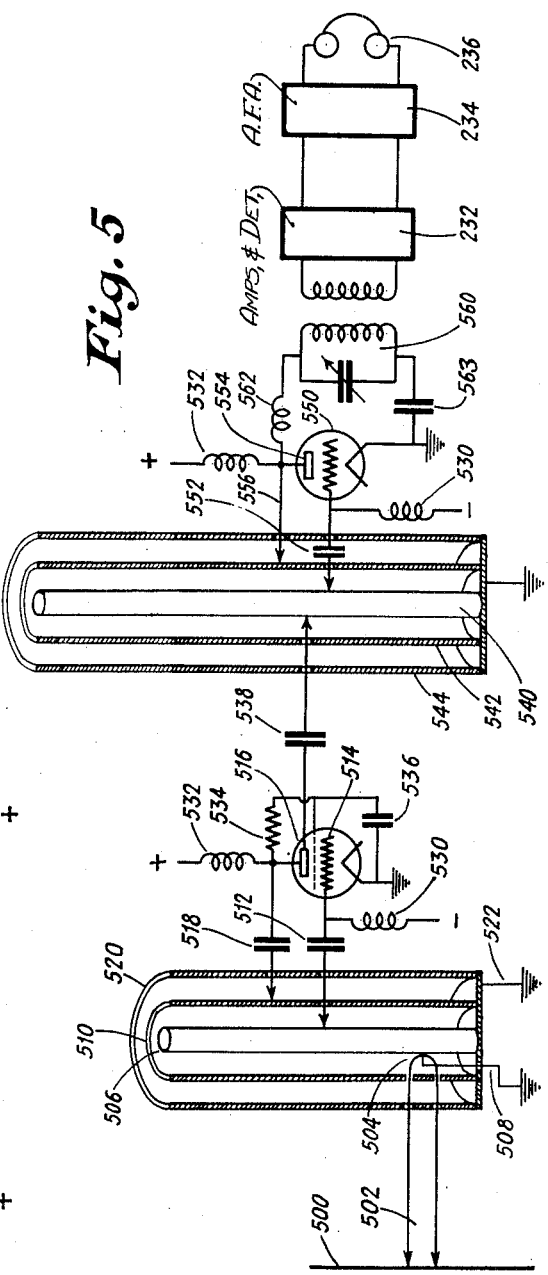

Turning to Figure 5, short wave length energy picked up upon antenna 500 is fed to transmission line 502 and through loop 504 to the resonant line 506. The loop 504 feeds the energy into the line 506 inductively, the loop being grounded at a voltage nodal point by means of the conductor 508. The receiving energy is resonated on the exterior surface of the resonant line 506 and the interior surface of the concentric cylinder 510 and fed through blocking condenser 512 and thence on to grid 514 of the first radio frequency amplifier tube 516. The amplified energy is fed through blocking condenser 518 to the outer surface of the metallic cylinder 510 and resonated there and also on the inner surface of the outer tube 520. The bottoms of all of the tubes 506, 510, 520 are grounded by lead 522.

Grid bias for the tube 516 is fed through choke coil 530, plate voltage is fed through choke coil 532 and screen grid bias is obtained by means of the voltage dropping resistor 534. The screen grid is maintained at radio frequency ground potential by means of a by-passing condenser 536.

The amplified energy is fed through blocking condenser 538 to the inner tube 540 of the concentrically arranged tubes 540, 542, 544. These tubes are adjusted so as to be of such a length as to resonate at a desired local oscillator frequency somewhat lower than the incoming frequency so that the beat produced under the control of these concentric tubes is of a desired value. The oscillating first detector tube 550 has its grid connected through a by-passing condenser 552 to the inner tube 540 and its plate 554 through a lead 556 to the outer surface of the concentric tube 542. The tubes 540, 542 and 544 are one-quarter wave length long at the desired local oscillator frequency, the taps on the connections from tube 550 to the lines 540, 542 being so adjusted as to cause oscillation generation due to inter-electrode feed-back of the tube 550. These locally generated oscillations, together with the oscillations fed through condenser 538 combine to form a beat frequency which is resonated in the circuit 560 tuned to the beat and completed to the cathode through the blocking condenser 563. This resonated beat frequency energy is fed to further beat frequency amplifiers and detectors 232, audio frequency amplifier 234, and, finally, to the translating device or utilization means shown in the form of a telephone 236.

If desired, the tubes 540, 542, 544 may be made shorter than the tubes 506, 510 and 520, in which case the local oscillator 550 will provide oscillations higher in frequency locally, than the incoming waves and these, when beat with the incoming waves, will produce the desired beat note or beat frequency energy in the beat frequency circuit 560. In order to keep the locally generated oscillations out of the beat frequency circuit a choke coil 562 is provided.

Figure 7:
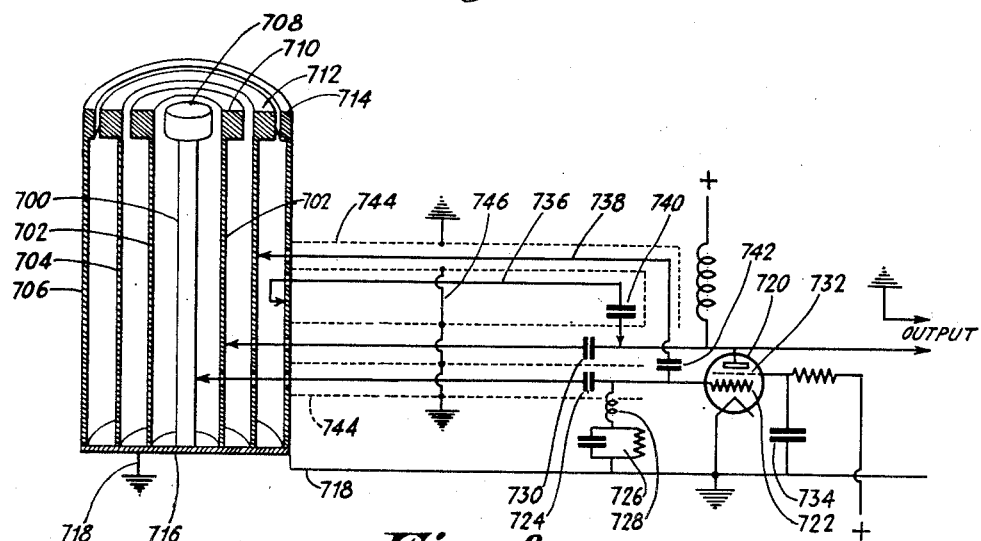
Figure 7 is a modification illustrating the way cylinders of non-uniform diameter may be arranged to form input, output and feedback circuits for an oscillation generator.

In the arrangement shown in Figure 7, I have provided low loss grid and plate circuits and also a low loss feed-back circuit connected between plate and grid. The low loss circuits as before are made of concentric cylinders, but differ from those shown heretofore in that the cylinders are of non-uniform diameter. More specifically, turning to Figure 7, I have provided concentric cylinders 700, 702, 704, 706 provided with enlarged heads 708, 710, 712 and 714. The various elements are connected at their bottoms to metallic grounding element 716 grounded by lead 718. The grid circuit of tube 720 consists of the outer surface of 700, 708 and the inner surface of 702. The grid 722 is connected to the grid circuit through the blocking condenser 724. Grid bias is provided by the action of the grid leak-condenser combination 726 connected in series with the choke 728. The combination is connected between the grid 722 and the cathode of tube 720.

The plate of tube 720 is connected through by-passing condenser 730 to the outer surface of tube 702. Inter-electrode feed-back in the tube 720 is prevented by means of the screen grid 732 which is grounded for high frequency currents by the action of the blocking condenser 734. Feed-back for oscillation generation takes place through the leads 736, 738 connected respectively, to the plate and grid of tube 720 through blocking condensers 740, 742. Preferably, the various leads are shielded by shields 744 which are grounded by connection 746, as shown. The length of the various tubes are so chosen as to produce the correct reactances at the desired operating frequency and the various cylindrical taps are connected, as shown, at points so as to produce the proper loading consistent with frequency stability and efficiency of operation.

Figure 7A:
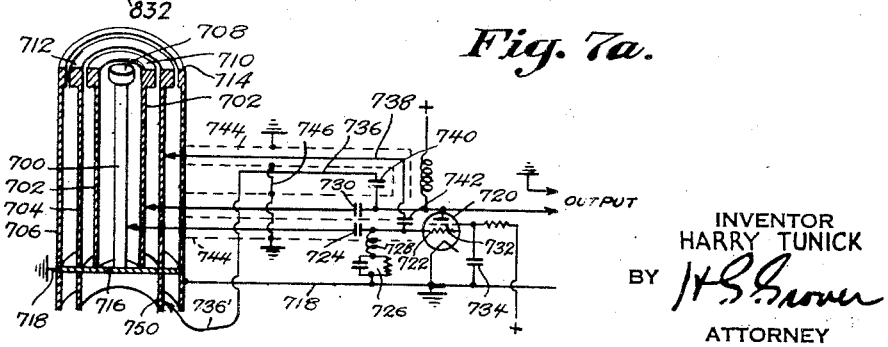
Fig. 7a is a modification of the device illustrated in Fig. 7.

An alternative way of obtaining proper connection for the circuit connected across the grid and plate is shown in Figure 7a. In this figure the element 704 may be extended below the grounding plate 716, as at 750, and the lead 736 connected thereto as shown at 736'. In this event, the tube 706 should also be extended so as to cancel any possible radiation from the lower portion 750 of tube 704.

Figure 8:
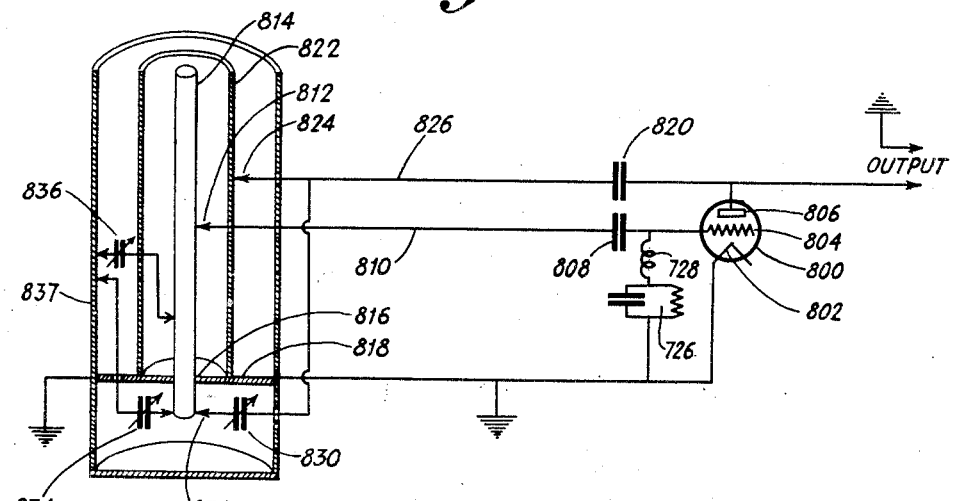
Figure 8 is still another oscillator modification employing the principles of my present invention.

Figure 8 shows an oscillation generator system with adjustable feed-back. The vacuum tube 800 is provided with the cathode 802, grid 804 and plate 806. As in Figure 7, grid bias is produced by the action of the grid leak and condenser combination 726 connected in series with the choke coil 728. The grid is connected through blocking condenser 808 and conductor 810 to a suitable point 812 on the inner low loss tube 814. The tube 814 is preferably one-quarter wave length long from its top portion to point 816 where it is connected to the grounded metallic plate 818. The plate of tube 800 is connected through blocking condenser 820 to the concentric metal tube 822 at point 824 suitably chosen as to impedance value and also as regards loading of the tube. The plate lead 826 is connected through the regeneration control condenser 830 to that portion of the cylinder 814 which extends below the grounded plate 818. The tap 832 and condenser 830 are so adjusted as to more than counter-balance the feed-back between the plate 806 and the grid 804 to such a degree that oscillations will be produced. It will be found that with this adjustment efficiency of the system will be augmented. If desired, the condenser 830 may be adjusted so as to completely balance the feed-back through the tube, in which case condenser 834 of suitable value and its adjustment and its tapping points may be connected as shown to the inside surface of the outer cylindrical tube 837 and the lower end of tube 814 so as to produce the required feed-back for oscillation generation. In the alternative, both the condensers 834 and 830 may be omitted and condenser 836 be connected, as shown, for regeneration control and oscillation generation.

The tubes shown in the figures need not necessarily be mounted outside of the concentric cylinders, but are preferably mounted within the inner cylinder, as shown in Figures 9 and 10. While these figures do not show output circuits made up of concentric tubes, they do, however, indicate the manner in which the tubes may be mounted. In the single vacuum tube arrangement of Figure 9, the vacuum tube 900 is mounted within the quarter wave length cylinder 902, as shown. The cylinder 902 is grounded at its bottom end and the grid 904 of the tube 900 is connected to the outer surface of cylinder 902, as shown. The plate circuit, which consists of a coil and condenser combination 906, is provided with a tuning knob 908 which protrudes through the cover, not shown, of the oven 912. The oven is provided with a thermostat 914, a heater 916 and a battery 918 for rough temperature control. Fine temperature control is provided within the inner cylinder by means of battery or other source of potential 920, heating resistor 922 and thermostat 924. Output energy is taken from the coil 926 and fed to any suitable load circuit, such as an antenna, 928. The outer concentric cylinder 930 may be omitted, in which case the entire oven 912 should be made of metal or should be provided with metal walls facing the low loss circuit forming the grid circuit of the oscillation generator. The push-pull arrangement of the system of Figure 9 is shown in Figure 10. The oven 1000 is provided with the heaters 1002, 1004, 1006, 1008 energized by a source of potential 1010, under control of the thermostat 1012. The vacuum tubes 1014 and 1016 are supported on the insulating supports 1018, 1020 and are provided with a common plate or output circuit 1022. The power supply leads 1024 are brought in at the electrical center of the frequency controlling tube 1026, as is also the plate condenser shaft and knob 1027. The inner cylindrical tube 1026 is supported upon the outer concentric cylinder 1028 by means of the insulators 1030. The outer concentric cylinder, in turn, is supported within the oven 1000 by means of insulators 1032, 1034. The filaments of the vacuum tubes, as shown, are provided with chokes 1040, 1042 which permit the filaments to assume proper high frequency potentials. The grids of the vacuum tubes are tapped to the outer surface of the frequency controlling cylinder 1026 at suitable tapping points 1050, 1052 through the blocking condensers 1054, 1056. Grid bias is fed in through chokes 1058, 1060 and plate potentials is fed in through chokes 1062 and 1064, which may be shunted by resistors 1066, 1068, if desired.

It should be clearly understood that in the modifications shown in Figures 1 to 8 inclusive, the methods of supporting the tubes and the temperature control systems of Figures 9 and 10 may be employed. Also, in addition to temperature control, any of the modifications herein described may be provided with additional apparatus to render the lengths of the circuits constant despite changes in ambient temperature. This additional apparatus may take the form of the Invar rod and bellows type of end for a concentric tube line, such as described by Fred H. Kroger in his applications Serial No. 1489, filed January 12, 1935, and Serial No. 5058, filed February 5, 1935. Also, the oscillators described herein may be modulated in any suitable way although the modulation circuits have been omitted. For example, grid or plate modulation may be used.

Attention is directed to the fact that Figures 5 and 6 herein appear as Figures 1 and 2, respectively, in my copending divisional application Serial No. 129,006, filed March 4, 1937, and Figures 9 and 10 appear as Figures 1 and 2 in my copending divisional application Serial No. 129,008, filed March 4, 1937.

Having thus described my invention, what I claim is:

1. A high frequency system including a multi-electrode vacuum tube having an input circuit comprising a pair of concentric tubes, each effectively a one-quarter wave length long at a desired operating frequency, and an output circuit comprising a pair of concentric tubes each one-quarter wave length long at the desired operating frequency, the tubes of said input circuit and of said output circuit being concentrically arranged to conserve space.

2. High frequency apparatus comprising a first tubular conductor, a second concentric tubular conductor, and a third concentric tubular conductor, a vacuum tube having a grid, a cathode, and a plate, a connection from said cathode to said first tubular conductor, a connection from said grid to a point on the exterior surface of said first tubular conductor intermediate its ends, and a high frequency connection from said plate to a point on the exterior surface of said second tubular conductor intermediate its ends.

3. A high frequency system including a vacuum tube having a cathode, an anode and a grid, a circuit comprising a pair of concentric tubes connected to said grid and cathode, another circuit comprising a pair of concentric tubes connected to said grid and anode, and another circuit comprising a pair of concentric tubes connected to said anode and cathode.

4. Apparatus as claimed in claim 3 characterized by the fact that all of said tubes are arranged concentrically.

5. A high frequency system comprising an electron discharge device having grid and anode electrodes, three concentric low-loss conductors, means coupling the grid of said device to the outer surface of one of said conductors intermediate its ends, and means coupling the anode of said device to the outer surface of another of said concentric conductors intermediate its ends.

6. Apparatus as claimed in claim 1 characterized by the fact that said concentric tubes are adjustable in length.

7. Apparatus as claimed in claim 3 characterized by the fact that said concentric tubes are made adjustable in length.

8. A high frequency system comprising an electron discharge device having grid and anode electrodes, three concentric low-loss conductors, means coupling the grid of said device to the outer surface of one of said conductors intermediate its ends, and means coupling the anode of said device to the outer surface of another of said concentric conductors intermediate its ends, said concentric conductors being adjustable in length.

9. A high frequency system including a vacuum tube having an input circuit comprising a pair of concentric metallic tubes, each a half wave length long at a desired operating frequency, and an output circuit comprising another pair of concentric metallic tubes each a half wave length long at the desired operating frequencies, the tubes of said input circuit and said output circuit being concentrically arranged to conserve space.

10. Apparatus as claimed in claim 3 characterized by the fact that each of said concentric tubes is made one-quarter wave length long at a desired operating frequency.

11. Apparatus as claimed in claim 3 characterized by the fact that each of said concentric tubes is made one-half wave length in length at a desired operating frequency.

12. Apparatus as claimed in claim 5 characterized by the fact that each of said concentric tubes is made one-quarter wave length long at a desired operating frequency.

13. Apparatus as claimed in claim 5 characterized by the fact that each of said tubes is made one-half wave length long at a desired operating frequency.

14. In combination, an electron discharge device having an anode, a cathode, and a control electrode, an oscillatory circuit in the form of a pair of concentric tubular conductors, said tubular conductors having substantially uniformly distributed inductance and capacitance, a connection from said anode to a point on the outer surface of the outer tubular conductor of said pair and intermediate its ends, a connection from the control electrode to the outer surface of the inner tubular conductor of said pair, and a connection from said cathode to both said inner and outer conductors.

15. In combination, an electron discharge device having an anode, a cathode and a control electrode, an oscillatory circuit in the form of a pair of concentric metallic tubular conductors coupled together at one end, a connection from said cathode to said coupled end of said oscillatory circuit, a connection from said control electrode to the outer surface of the inner tubular conductor of said pair at a point intermediate the ends of said inner conductor and spaced from said coupled end, and another connection from said anode to the outer surface of the outer tubular conductor of said pair, also at a point intermediate the ends of said outer conductor and substantially spaced away from said coupled end.

16. A high frequency system including a vacuum tube having a cathode, an anode and a grid, a circuit comprising a pair of concentric tubular surfaces connected to said grid and cathode, another circuit comprising a pair of concentric tubular surfaces connected to said grid and anode, and another circuit comprising a pair of concentric tubular surfaces connected to said anode and cathode.

17. Apparatus as claimed in claim 16, characterized by the fact that all of said tubular surfaces are arranged concentrically.

18. Apparatus as claimed in claim 16, characterized by the fact that said concentric tubular surfaces are made adjustable in length.

19. A high frequency system having first, second and third concentric conductors, a metallic plate arranged transversely of said conductors and coupling same together, whereby said first and second conductors form one tuned circuit and said second and third conductors form another tuned circuit, a vacuum tube having a grid, an anode, and a cathode, a connection from said grid to the outer surface of said first conductor, a connection from said anode to the outer surface of said second conductor, and a connection from said cathode to said metallic plate.

20. A high frequency system having first, second and third concentric conductors, a metallic plate arranged transversely of said conductors and coupling same together, whereby said first and second conductors form one tuned circuit and said second and third conductors form another tuned circuit, a vacuum tube having a grid, an anode, and a cathode, a capacitive connection from said grid to the outer surface of said first conductor, a capacitive connection from said anode to the outer surface of said second conductor, and a connection from said cathode to said metallic plate.

21. A high frequency system having first, second and third concentric conductors, a metallic plate arranged transversely of said conductors and coupling same together, whereby said first and second conductors form one tuned circuit and said second and third conductors form another tuned circuit, a vacuum tube having a grid, an anode, and a cathode, a capacitive connection from said grid to the outer surface of said first conductor, a capacitive connection from said anode to the outer surface of said second conductor, a connection from said cathode to said metallic plate, and a regeneration control connection from said second capacitive connection to the outer surface of said first conductor.

22. A high frequency system having first, second and third concentric conductors, a metallic plate arranged transversely of said conductors and coupling same together, whereby said first and second conductors form one tuned circuit and said second and third conductors form another tuned circuit, one of said conductors extending beyond and on both sides of said metallic plate, a vacuum tube having a grid, an anode, and a cathode, a connection from said grid to the outer surface of said first conductor, a connection from said anode to the outer surface of said second conductor, a connection from said cathode to said metallic plate, and a regeneration control connection from the extension of said one conductor to said anode.

23. A high frequency system having first, second and third concentric conductors, a metallic plate arranged transversely of said conductors and coupling same together, whereby said first and second conductors form one tuned circuit and said second and third conductors form another tuned circuit, a vacuum tube having a grid, an anode, and a cathode, a connection from said grid to said first conductor, a connection from said anode to the outer surface of said second conductor, and a connection from said cathode to said metallic plate.

24. A high frequency system having first, second and third concentric conductors, a metallic plate arranged transversely of said conductors and coupling same together, whereby said first and second conductors form one tuned circuit and said second and third conductors form another tuned circuit, a vacuum tube having a grid, an anode, and a cathode, a capacitive connection from said grid to said first conductor, a capacitive connection from said anode to the outer surface of said second conductor, a connection from said cathode to said metallic plate, and a capacitive regeneration control connection from said second capacitive connection to the outer surface of said first conductor.

25. A high frequency system having first, second and third concentric conductors, a metallic plate arranged transversely of said conductors and coupling same together whereby said first and second conductors form one tuned circuit and said second and third conductors form another tuned circuit, a vacuum tube having a grid, an anode, and a cathode, a capacitive connection from said grid to the outer surface of said first conductor, a capacitive connection from said anode to the outer surface of said second conductor, a connection from said cathode to said metallic plate, and a regeneration control connection from said first conductor to the inner surface of said third conductor.

26. A high frequency system having first, second and third concentric conductors, means coupling said conductors together at such points as to provide critical electrical lengths for said conductors, whereby said first and second conductors form one tuned circuit and said second and third conductors form another tuned circuit, an input circuit coupled between said first and second conductors at at least one point intermediate the ends thereof, and an output circuit coupled between said second and third conductors at at least one point intermediate the ends thereof.

HARRY TUNICK.